United States Patent [19]

Faulhaber

[11] Patent Number: 5,453,851
[45] Date of Patent: Sep. 26, 1995

[54] ERROR REDUCTION METHODS IN SCANNING SYSTEMS

[75] Inventor: Mark E. Faulhaber, Wilmington, Del.

[73] Assignee: E. I. du Pont de Nemours and Company, Wilmington, Del.

[21] Appl. No.: 922,653

[22] Filed: Jul. 31, 1992

[51] Int. Cl.$^6$ ........................................ H04N 1/04
[52] U.S. Cl. ........................ 358/481; 358/482; 358/256; 358/300
[58] Field of Search ........................ 358/481, 300, 358/287, 296, 285, 302, 8, 293, 95, 75, 406; 235/462, 467, 455; 250/226, 719, 176, 235, 236, 561; 356/5, 4; 382/31, 42, 43; 359/204, 206, 618

[56] References Cited

U.S. PATENT DOCUMENTS

| | | | |
|---|---|---|---|
| 3,560,758 | 2/1971 | Swanberg | 250/226 |
| 3,843,890 | 10/1974 | Anthony, Jr. et al. | 250/563 |
| 3,955,096 | 5/1976 | Faulhaber | 250/565 |
| 3,986,037 | 10/1976 | Faulhaber | 250/562 |
| 4,005,281 | 1/1977 | Faulhaber et al. | 235/151.3 |
| 4,169,275 | 9/1979 | Gunning | 358/300 |
| 4,205,350 | 5/1980 | Gunning | 358/296 |
| 4,302,782 | 11/1981 | Gunning et al. | 358/296 |
| 4,400,740 | 8/1983 | Traino et al. | 358/293 |
| 4,521,111 | 6/1985 | Paulson, Jr. et al. | 356/367 |
| 4,538,915 | 9/1985 | Faulhaber | 356/431 |
| 4,720,732 | 1/1988 | Kaneko | 250/235 |
| 4,831,247 | 5/1989 | Ishizaka | 250/205 |
| 4,915,498 | 4/1990 | Malek | 356/5 |
| 4,933,688 | 6/1990 | Brophy | 358/296 |
| 4,961,079 | 10/1990 | Owens et al. | 358/75 |
| 4,982,206 | 1/1991 | Kessler et al. | 346/108 |
| 4,985,629 | 1/1991 | Horikawa | 250/327.2 |
| 5,006,721 | 4/1991 | Cameron et al. | 250/561 |
| 5,018,805 | 5/1991 | Kessler | 350/6.5 |
| 5,023,448 | 6/1991 | Kessler et al. | 250/235 |
| 5,097,119 | 3/1992 | Breitmeier | 250/201.4 |
| 5,165,074 | 11/1992 | Melino | 358/481 |
| 5,175,775 | 12/1992 | Iwaki et al. | 382/31 |
| 5,194,980 | 3/1993 | Roddy | 359/204 |
| 5,276,463 | 1/1994 | Andrews | 346/108 |
| 5,288,983 | 2/1994 | Hakazawa | 235/462 |

FOREIGN PATENT DOCUMENTS 2007459  5/1979  United Kingdom ............ H04N/1/04

*Primary Examiner*—Paul Ip

[57] ABSTRACT

A method for correcting image exposure and positional errors, arising from the components and geometry of a scanning system, wherein compensating electronic signals are generated to modulate the image data in order to correct said errors.

18 Claims, 6 Drawing Sheets

ERROR REDUCTION METHODS IN SCANNING SYSTEMS

FIELD OF INVENTION

This invention relates to a scanning system wherein errors associated with the laser output intensity, mirror reflectivity, modulator efficiency, system geometry, etc. are determined individually, proportioned to a common reference, and then combined to produce a corrective signal to provide improved image accuracy.

BACKGROUND OF INVENTION

In the field of scanning systems, especially in systems having components of low precision for cost competitive reasons, errors exist due to variations in the performance of the components. For example, a laser in a scanning system may have variations in output due to aging of the components or due to frequency characteristics of the power supply. Or, for example, the reflectivity of a polygon mirror may vary from facet to facet.

There is a need to correct for the variations in scanning systems such that they are capable of producing a reduced error or error-free image. Other approaches exist that correct for image errors using sensors adapted to monitor generally a sum sampling of the exposure errors. Such prior attempts have neglected to monitor the variations of the individual components separately in an appropriate manner and then compensate for the error introduced by each component by combining the individual variations or errors and adjusting for the combined errors.

For example, U.S. Pat. No. 4,400,740 (Traino et al.) describes a scanning system adapted to monitor the intensity of an exposure beam and to correct for the variation in intensity of the exposure beam. The method taught by this patent, however, monitors the beam intensity using a single sensor adapted to intercept the scanning beam for only a moment during the relatively longer period of time that the beam exposes the photoreceptor in the image plane. While such a method for controlling exposure variations might be adequate for correcting for polygon facet reflectivity error or low frequency variations in the intensity of the laser beam, the method is not adaptable to compensate for high frequency variations in laser beam intensity.

Another example is U.S. Pat. No. 4,831,247 (Ishizaka). One method taught by this patent utilizes a single detector, as described in the above referenced Traino et al. patent, but uses different control circuitry to modulate the laser beam as a function of imaging beam intensity variations caused by polygon facet reflectivity errors. As described above such an approach is not adaptable to allow a continuous monitoring of the laser beam intensity and therefore is not adaptable to compensate for high frequency variations in intensity. This patent also teaches a method for monitoring variations in polygon facet reflectivity on a continuous basis. However, the method is not concurrently capable of monitoring the imaging beam variation on a continuous basis. In addition, the method taught by Ishizaka does not separate the variations in intensity of the reference laser beam from the variations in facet reflectivity. Such a correction method has the potential of doubling the error of the exposure should the laser intensity variations of the reference laser be out of phase with the intensity variations of the imaging laser.

Montagu, "Laser Beam Scanning", Gerald F. Marshall Editor, published by Marcel Dekker, Inc. (1985), at pages 255–274, describes electronic means to correct for flat field scanning positional errors when using galvanometer and resonant mirror scanning systems. Other sources of errors, such as laser intensity stability errors etc., are mentioned. However, the article does not teach electronic means for sensing the errors individually and then combining error compensation signals in order to correct for several of the scanning errors in the system as a group.

In view of the foregoing it is believed advantageous to provide a system that monitors both continuous and incremental errors, combines the individually monitored continuous and incremental errors into a continuous system error correction signal, and applies the combined system error correction signal in order to compensate for the errors in the system.

SUMMARY OF THE INVENTION

In one aspect the present invention relates to a laser scanning system comprising: means for generating electrical signals representative of variations or errors present in at least two elements of the scanning system, means for proportioning or scaling each of the error signals with respect to a common reference, and means for combining such scaled errors to produce a total system error. The total system error signal may be used to modulate image information thereby to correct for system errors so that such system errors are substantially reduced. The imaging quality capability of the scanning system is thereby improved.

More specifically, the instant invention includes: 1) means for continuously monitoring the intensity of a laser beam in a manner such that both low frequency and high frequency variations or errors in the beam intensity are sensed and for generating an electrical signal representative thereof, 2) means for generating an electrical signal representative of individual facet reflectivity variations or errors in a polygonal reflecting mirror, and 3) means for generating an electrical signal representative of errors due to the scanning of a reflected laser beam across an imaging area. Means is provided for proportioning or scaling these electrical signals with respect to a common reference. Means is provided for combining these proportioned or scaled signals into a total error correction signal. The total error correction signal is is used to modulate an image data signal to create a modulated image signal which is compensated for the variations in the scanning system. The modulated image signal is used to modulate the laser beam, as through an acousto-optic modulator, in a manner that provides a corrected imagewise exposure in the image plane.

The instant invention also includes means to correct for scanner geometry errors which create positional errors in the image. For example, correction for two scanner geometry errors are taught. One error is due to using a radial geometry for creating the image. This error is called radial position error. Another error is radial protrusion error. Means is described to produce electrical radial correction signals that correct for these errors. The radial correction signals allow the formation of images corrected for scanner radial geometry-induced errors.

—o-0-o—

In another aspect this invention is directed to a method for correcting errors in a scanning system having a laser beam, an acousto-optic modulator adapted to modulate the beam, a rotating polygon having facets adapted to reflect the modulated beam across an image plane, and an image data signal driven at a pixel rate, wherein the improvement comprises the steps of:

a) sensing the intensity of a laser beam, said beam having intensity variations;

b) determining the reflectivity of each of the facets of the polygonto obtain a facet reflectivity variation;

c) determining a velocity exposure error;

d) proportioning said sensed intensity variation relative to a common reference in order to create a intensity variation signal proportional to said beam intensity variation;

e) proportioning said facet reflectivity variation relative to said common reference in order to create a facet reflectivity variation signal proportional to said facet reflectivity variation;

f) proportioning said velocity exposure error relative to said common reference in order to create a velocity exposure correction signal proportional to said velocity exposure error;

g) combining said intensity variation signal, said facet reflectivity variation signal, and said velocity exposure correction signal in order to provide an error correction signal, said error correction signal being adapted to correct for said beam intensity variation, said facet reflectivity variation, and said velocity exposure error;

h) combining said error correction signal with the image data signal in order to provide a modulated image signal; and, i) in coordination with the rotation of said polygon controlling said acousto-optic modulator in accordance with said modulated-image signal in order to provide a corrected imagewise exposure in the image plane.

This aspect of the invention further comprises the steps of:

j) determining a radial position error correction value;

k) determining a radial protrusion error value;

l) combining said radial position error correction value and said radial protrusion error value in order to develop a radial correction signal proportional to the summation of said radial position error correction value and said radial protrusion error value; and, m) modifying the pixel rate of said image data signal in accordance with said radial correction signal.

—o-0-o—

In yet another aspect this invention is directed to a method for correcting errors in a scanning system having a rotating polygon having facets adapted to reflect a modulated beam across an image plane, and an image data signal driven at a pixel rate, wherein the improvement comprises the steps of:

a) establishing a radial protrusion error value;

b) developing a radial correction signal proportional to said radial protrusion error value; and, c) modifying the pixel rate of said image data signal in accordance with said radial correction signal.

In a modification, a radial position error correction value may be combined with the radial protursion value to develop a radial correction signal which is used to modify the pixel rate.

BRIEF DESCRIPTION OF THE DRAWINGS

The invention may be more fully understood from the following detailed description thereof taken in connection with the accompanying drawings which form a part of this application and in which.

DETAILED DESCRIPTION OF THE INVENTION

Figure 1:
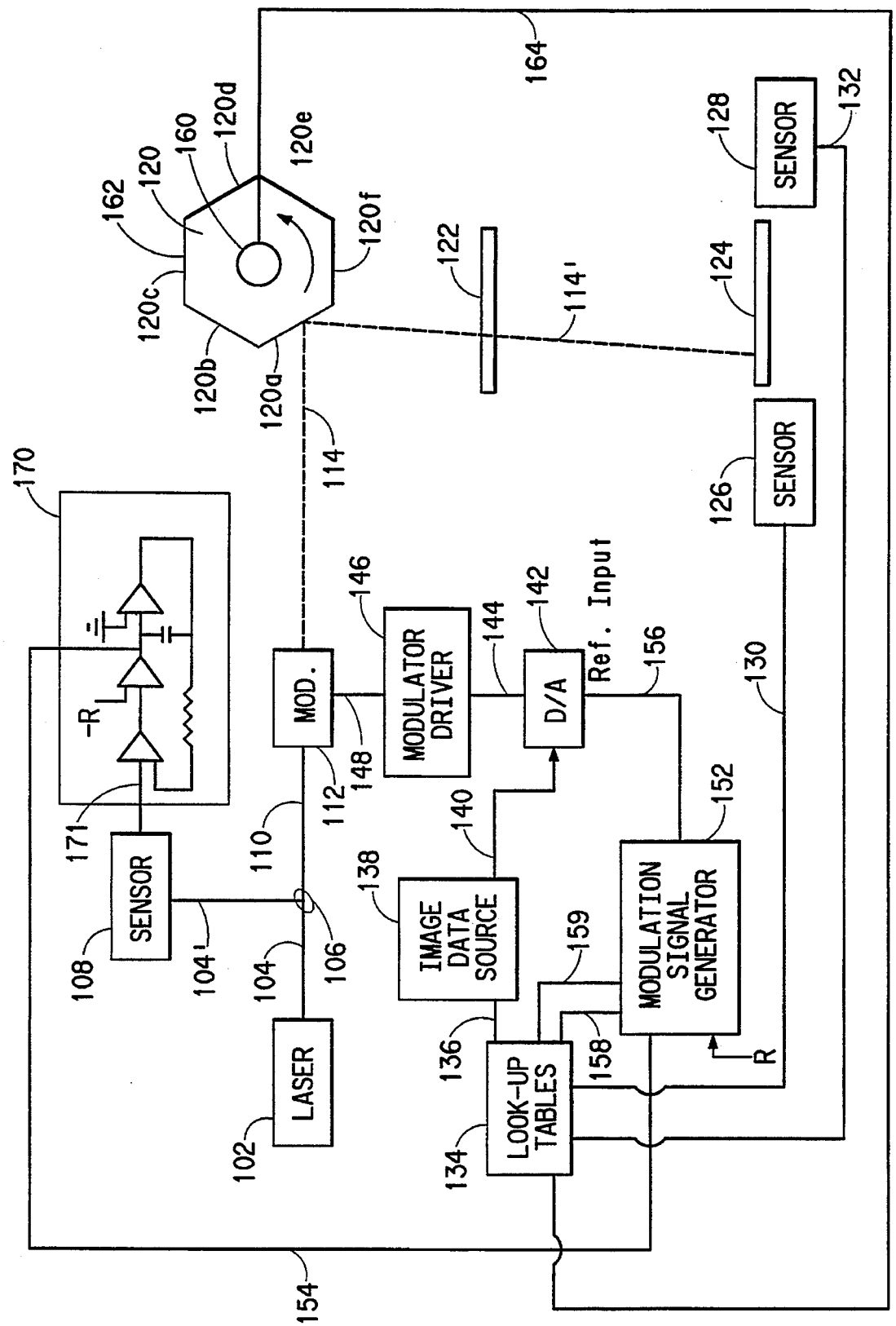
FIG. 1 shows an overall schematic view of a preferred embodiment of the instant invention.

Throughout the following detailed description similar reference numerals refer to similar elements in all figures of the drawings.

With some scanning systems there is a requirement for high precision output or input capability. In the past, such high precision was often obtained by use of highly accurate and highly uniform components and optics. These past practices often led to the use of expensive components which in turn increased the price of the scanning system. The instant invention allows the use of lower precision and hence lower cost components, while still maintaining high precision capability in the scanning system. In accordance with this invention the inaccuracies of the mechanical components or geometries in the scanner are compensated for by electronic means.

Although the present invention may be described in the context of a laser raster scanning system adapted to provide exposure to silver halide film imagewise for medical hardcopy use, it should be readily apparent that this invention is applicable to other output devices such as laser printers, laser plotters, stereolithographic equipment, and laser machining systems. The instant invention may also be applied in the field of input or reading scanners, it being well known that the errors involved in output scanning devices also have equivalent errors in input scanning devices.

Although the invention is specifically described in the context of a scanning system capable of providing a linear exposure, it would have applicability to scanning systems adapted to provide an area exposure. Likewise, many of the teachings relative to the use of a polygon or raster scanner would have applicability for galvanometer scanners, resonant scanners, motor encoder scanners, holographic scanners, etc. The invention may be used in either continuous tone or halftone systems, with any of silver halide, photopolymer, photoconductor, and other photosensitive materials.

FIG. 1 shows in schematic block diagram of a scanning system 100 in accordance with the instant invention. Comprised in the this system is a laser 102 with a polarized output beam 104. Typically, the laser 102 is a helium neon laser with an output beam 104 having a wavelength of 632.8 nm and a power of approximately 4 mW. A small portion, for example 4%, of this beam is reflected by beamsplitter 106 creating a reflected beam 104'. The reflected beam 104' exposes a sensor 108, such as a photodiode, which is adapted to continuously monitor the intensity of the reflected beam 104'. Since the reflected beam 104' is a percentage proportion of the the output beam 104 from the laser, the sensor 108 is in effect adapted to monitor the intensity of the beam 104. Beam monitoring circuit 170, to be described in more detail hereinafter, is electrically connected to sensor 108 by line 171. The circuit 170 is adapted to convert the electrical signals from sensor 108 into a normalized readout signal which is proportional to the variation in beam 104 intensity as monitored in reflected beam 104'. The remainder of beam 104 is substantially transmitted through beamsplitter 106 as beam 110. Since beam 110 is a percentage proportion of beam 104 and 104', the electrical signal developed in circuit 170 also is proportional to the intensity of beam 110 on a continuous basis. Other focusing optics in the system preferably exist and the reasons for such optics are generally known in the art. These optics are not shown since they are not essential for an understanding of the instant invention.

Beam 110 is then transmitted to modulator 112, such as an acousto-optic modulator. The modulator 112 is adapted to modulate beam 110 creating a first-order modulated beam 114. The modulated beam 114 is then transmitted to a rotating polygon 120 having mirror facets 120 *a–f*. In the preferred embodiment the polygon 120 has twenty facets instead of the six shown. The beam 114 is then reflected successively from each facet 120 *a–f* creating reflected beam 114'. Since polygon 120 is rotating, each facet 120 *a–f* causes reflected beam 114' to scan predominantly along a line in image plane 124. It is important for a clear understanding of the instant invention to point out that the individual facets 120 *a–f* of polygon 120 have variations in reflectivity, radial protrusion, and in angle that create relative variations or errors in scanned beam 114'. The variations in angle are of two types well known in the art. The first angular difference is that known as pyramidal error. In the presently preferred system the pyramidal error is substantially corrected by transmitting beam 114' through a cylindrical lens 122. Another type of angular error, called facet-to-facet angular error in the art, is preferably corrected by means of a start of scan sensor 126.

Radial protrusion error occurs when the facets 120 *a–f* in polygon 120 have a different distance from the face of each facet 120 *a–f* to the center of rotation of polygon 120. This creates a variation in speed with which beam 114' traverses the image plane 124. This speed variation may be determined for each facet 120 *a–f* utilizing signals from sensors 126 and 128 which are adapted to be intersected by scanning beam 114' at two different points preferably just outside the image plane 124. Signals from the sensors 126 and 128 are sent via lines 130 and 132 respectively to look-up tables 134. The velocity variations due to radial protrusion error are measured for each facet 120 *a–f* using sensors 126 and 128. The measured radial protrusion error values are then listed for each facet 120 *a–f* in look-up table circuit 134. The look-up table 134, communicating through line 136 to image data source 138, is adapted to provide signals relative to timing of the image data read-out from source 138. This timing is often referred to as the pixel rate. Such timing can be, for example, the timing from when a start of scan signal is given by sensor 126 to when the image data source 138 should begin reading out the data in order to provide exposures in the proper location in the image plane 124. The look-up table circuit 134 provides the pixel rate correction to the image data read out, for the line written in the image plane 124, as a function of facet 120 *a–f* radial-protrusion-error, radial-velocity-errors and other errors as will be more fully described hereinafter.

Based upon pixel rate signals from look-up tables 134, image data source 138 reads out timed image data signals through line 140 connected to the data input of the D/A converter 142.

These timed image data signals are then converted in D/A 142 to analog image signals. The analog image signals are also modulated in accordance with the signal on line 156 applied to the reference input of the D/A converter. During the D/A conversion the image signals are correcting for exposure errors to form modulated image signals. The modulated image signals are then output through line 144 to modulator driver 146 which in turn modifies the modulated image signals to an amplitude modulated radio frequency signal. This signal then passes through line 148 to acousto-optic modulator 112 which in turn controls the modulation of modulated beam 114.

Circuit 170 monitors the intensity variations of laser 102 and outputs an intensity correction signal, proportional to the normalized variation of the laser output beam 104, through line 154 to modulation signal generator 152. Error correction signals, from tables 134 via lines 158 and 159, are combined with the intensity correction signal from circuit 170 within modulation signal generator 152. Modulation signal generator 152 outputs the error correction signal through line 156 to the reference port of D/A converter 142. By utilizing the reference port of D/A 142 to correct for laser beam 104 and writing beam 114' intensity errors, the reflected beam 114' will have a writing intensity compensated for scanner variations such as, laser intensity variations, facet reflectivity variations, velocity exposure errors.

It is preferred to pre-characterize the facet 120 *a–f* reflectivity error and to input the normalized reflectivity error information in a list in look-up table 134. In this way, the facet 120 *a–f* reflectivity error can be fed back to the modulated-signal-generator 152 via line 158 during the scan. With such a system an encoder 160, having at least one encoder pulse 162, is preferably mounted to polygon 120 in order to provide a signal which can be sent along line 164 to look-up table 134. By combining the encoder signal in line 164 with, for example a start-of-scan signal in line 130, look-up table 134 can track the individual facet 120 *a–f* used for reflecting beam 114'. In this way, look-up table 134 can issue the proper facet reflectivity variation signal to modulation signal generator 152 and the correct pixel rate to image data source 138 based upon the facet 120 *a–f* currently reflecting beam 114'. The modulated image signal thus controls the acousto-optic modulator in coordination with the rotation of the polygon to provide a corrected imagewise exposure in the image plane.

Figure 2:
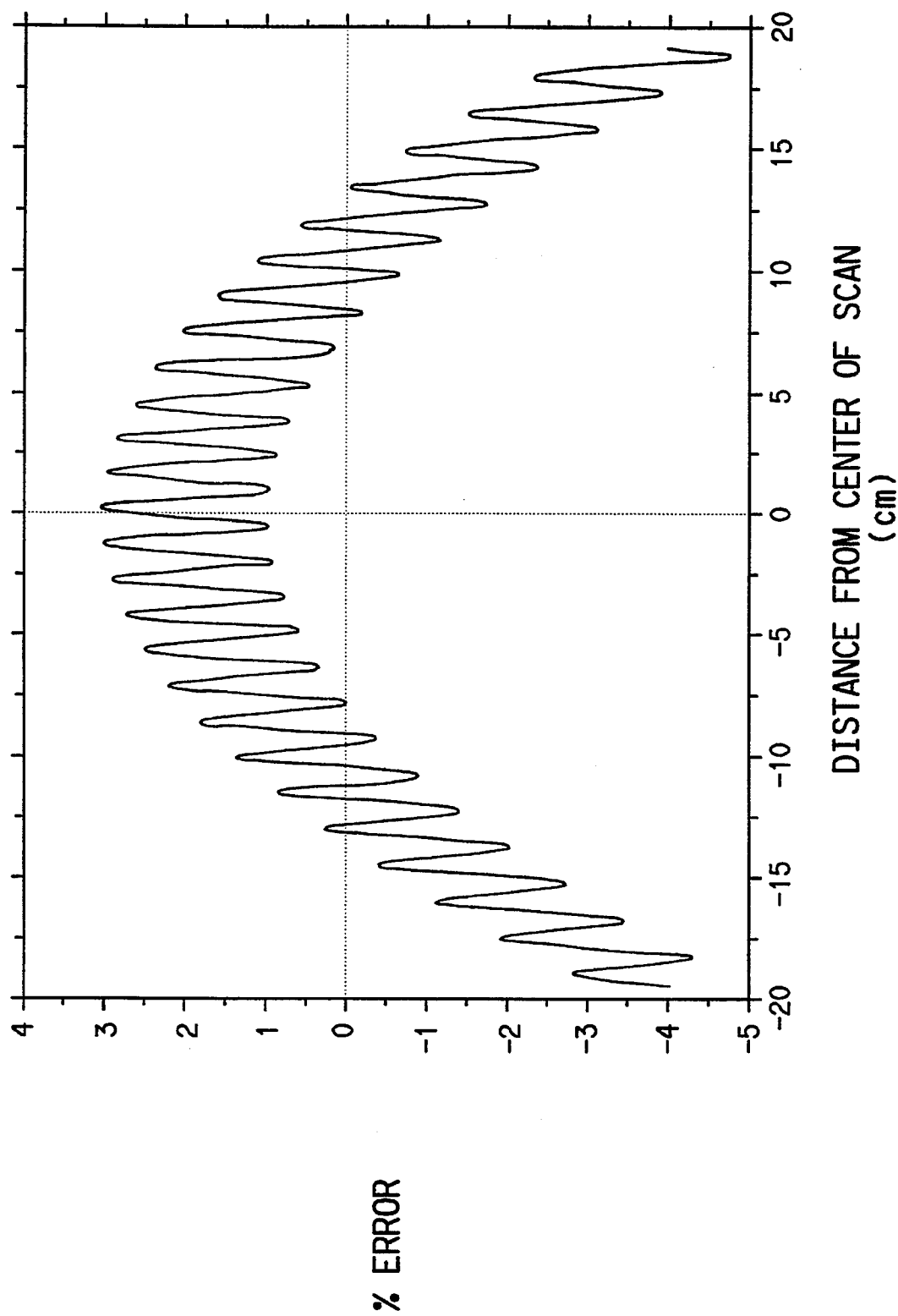
FIG. 2 is a calculated depiction of the errors in exposure that might occur in the image plane as a function of velocity-exposure-error, laser high-frequency intensity variations and facet-reflectivity-error.
Figure 3:
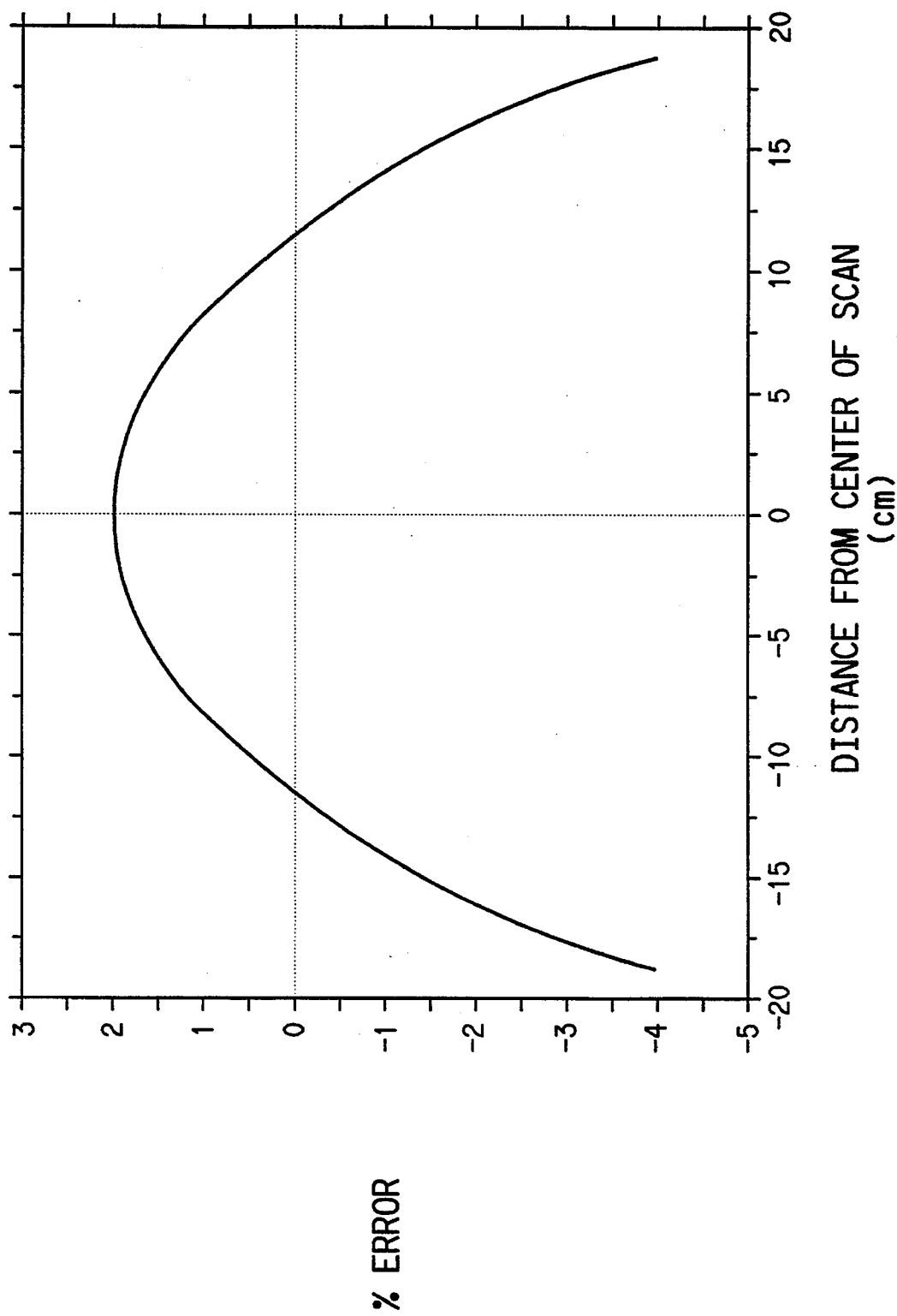
FIG. 3 is a calculated depiction of the errors in exposure that might occur in the image plane as a function of velocity-exposure-error and facet-reflectivity-error.
Figure 4:
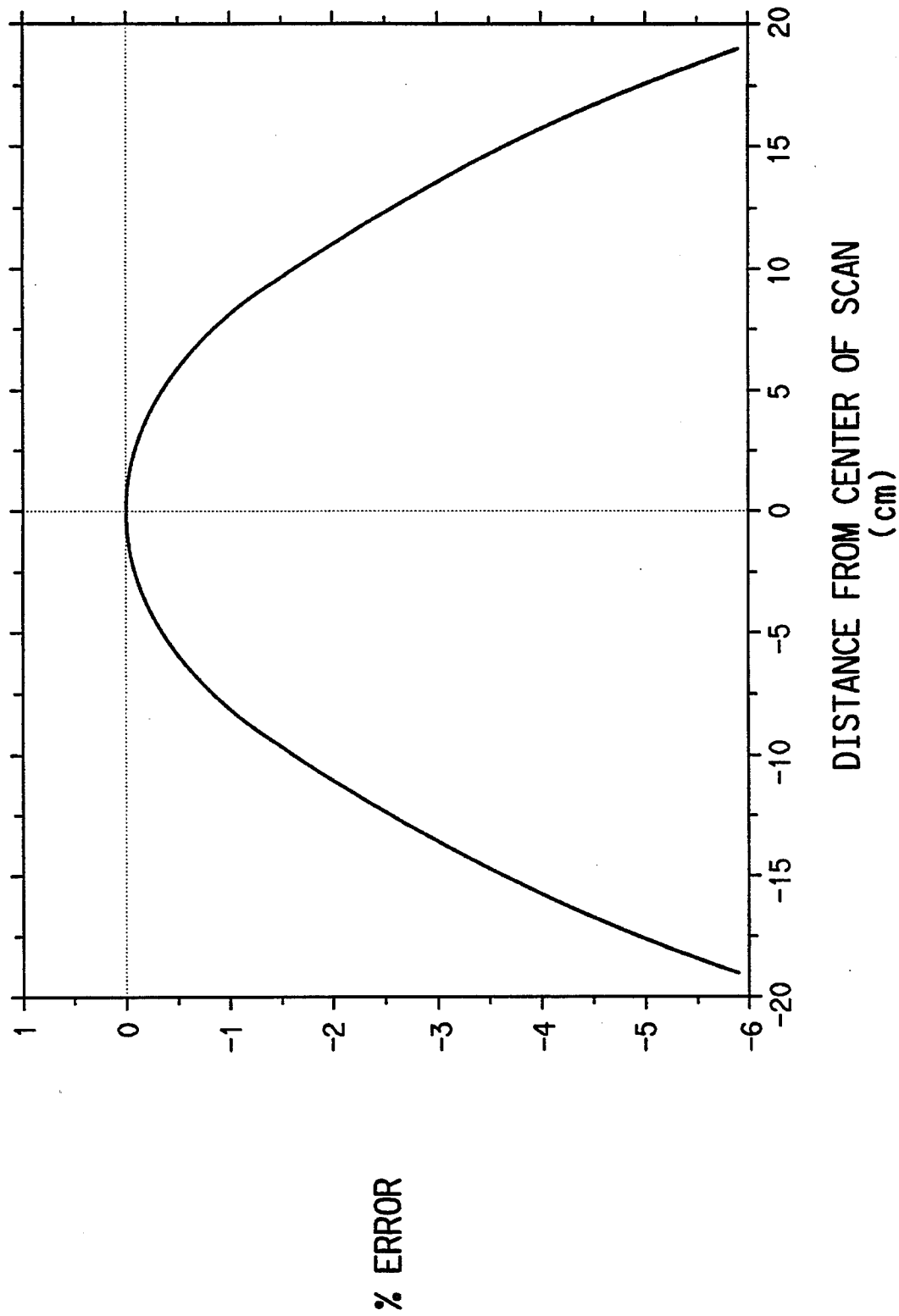
FIG. 4 is a calculated depiction of the error in exposure that might occur in the image plane as a function of velocity-exposure-error only.

Reference to FIGS. 2–4 provides a clearer understanding of the scanning variations dealt with by the instant invention. FIG. 2 shows the effects of some of the various errors involved in scanning a beam in an image plane wherein corrections, such as taught in the instant invention are not utilized. Uncorrected errors of radial exposure error, laser high-frequency intensity variations, and facet reflectivity error of the system 100 are plotted in FIG. 2. The Y axis displays the percent error in a single line exposure by the beam in the image plane assuming a constant ON image data signal. The X axis is the distance from the center of the scan, which in this case is assumed to be the center of the image plane 124 of FIG. 1. The oscillation, shown on the plot in FIG. 2, originates from the laser, which in this example has a twenty kHz intensity variation of 1%. If one corrects for this intensity variation utilizing the normalized intensity error correction signal derived from circuit 170 in FIG. 1 in combination with the modulation signal generator 152 feeding into the reference port of D/A 142 which modulates the signal to modulator 112, as taught by the instant invention, one would obtain an exposure error as shown in FIG. 3.

FIG. 3 shows the modeled scan system's exposure error having a velocity exposure error and a facet reflectivity error only. The U-shape of the curve is characteristic of the velocity exposure error as a function of scan radius when the image plane is a flat field. The center of the U-shape at the center of scan is offset, in this example, by 2%. This 2% offset is a function of facet reflectivity error which can change typically by about +/− 2% from an average facet reflectivity. In essence, another facet might have a different reflectivity error and therefore the velocity-exposure-error U-shape would move up or down according to the reflectivity error of the individual facet reflecting beam 118' of FIG. 1. If a facet reflectivity variation signal and an intensity variation signal from circuit 170 is combined to modify the reference signal leading into D/A converter 142 through modulation signal generator 152, the U-shaped curve would have a 0% error at the center of the scan. Just the velocity exposure error due to utilizing a radial scanning system to image a flat plane is shown in FIG. 4.

Velocity induced errors come from many sources but most of them arise as a result of the geometry of the scanning system. It is assumed, for the purposes of the instant invention, that variations in angular rotation speed of the polygon are corrected utilizing methods well known in the art. With a raster scanning system having a polygon and a flat image plane, there is a velocity error due to the change in scan radius and angle while scanning a line. This system geometry creates both beam radial position errors and velocity exposure errors. In addition, in a polygon scanning system, errors are introduced due to the fact that the beam reflects off different regions of the facet. For example, a beam reflecting off the center of a facet would have a different pointed position in the image plane than would the same beam reflecting off the edges of the facet, assuming the facet and beam are at the same relative angle. Or, for example, polygons having facets with a varying radial protrusion from the polygon center, such as for example when the rotation point in the polygon is off center, would create a varying traverse time across the image plane and associated positional and exposure inaccuracies. The instant invention is adaptable to account for and compensate for these geometrical errors in the scanning system by electronic means.

Figure 5:
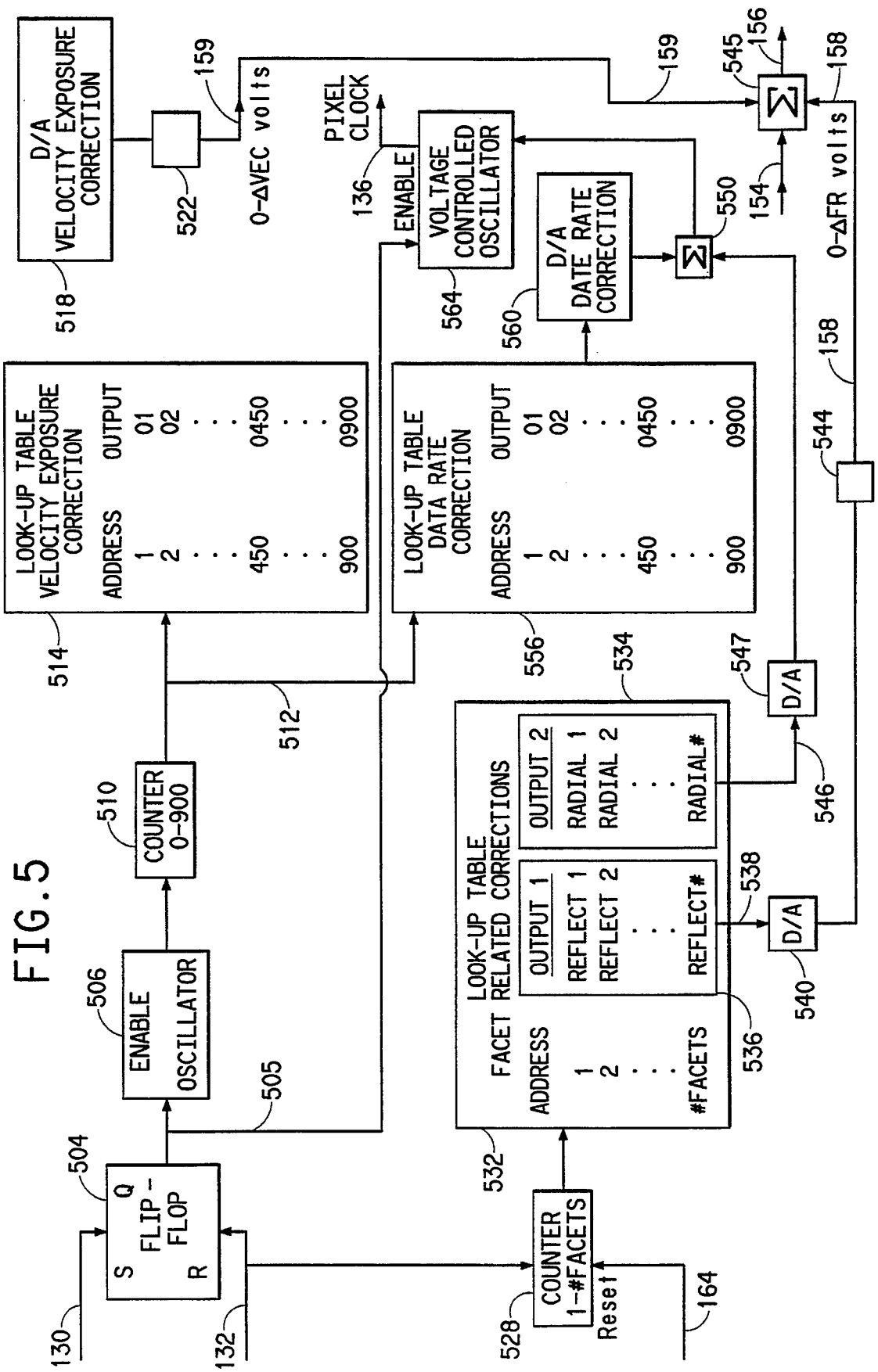
FIG. 5 is an exemplary schematic depiction of the look-up tables shown as item 134 in FIG. 1.

A more complete understanding of the means employed by the instant invention to monitor and compensate for these errors may be obtained by reference to FIG. 5 wherein there is provided a more detailed explanation of the look-up tables 134 of FIG. 1. In FIG. 5, start-of-scan signal and end-of-scan signal (generated by sensors 126 and 128 shown in FIG. 1) enter the look-up tables 134 via lines 130 and 132 respectively. These signals are entered into a reset-set flip-flop 504 adapted to output a digital signal which is high upon receiving a start-of-scan signal and low upon receiving an end-of-scan signal. The output 505 of flip-flop 504 is input into fixed oscillator 506 (and voltage controlled oscillator 564) as a common enable signal. When flip-flop 504 output is high, the oscillator 506 outputs a pulse signal to counter 510 at a frequency defined by the oscillator circuit. Driven by the pulse signal, counter 510 generates address signals in line 512 counting from, for example, 1–900 in succession. The address signals 1–900 are input into RAM look-up tables 514 and 556. Table 514 is a look-up table which lists values related to the velocity exposure correction. In the preferred embodiment, each address signal in line 512 represents a portion of the beam reflection angle from a facet, and each address causes the generation of a signal output value from the look-up table 514 representing the velocity exposure correction necessary to compensate for the velocity exposure error as shown in FIG. 4. For example, the image plane of the presently preferred embodiment employs a beam reflected from the polygon facets having a reflection angle of −13.5° to 13.5° to the image plane. An output correction value is calculated for each address which represents 0.03° of beam reflection angle. The presently preferred formula used for the correction is a function of $1/\cos^2 \emptyset$ wherein the angle $\emptyset$ varies from −13.5° to 13.5° in steps of 0.03°. Based upon the address call at the time, the output velocity exposure correction value is sent to a D/A converter 518 which creates a velocity exposure correction voltage proportional to the velocity exposure correction value of table 514. The velocity exposure correction voltage is proportioned, or scaled, with respect to a reference value R, by means of circuit 522, to create a velocity exposure correction signal in line 159 which is normalized and in proportion to the error in exposure that the velocity exposure error creates in the image plane. For example, if the normalized reference voltage leading into the modulator D/A converter 142 in FIG. 1 is nominally one volt, and the error in exposure created by velocity due to scan angle is at worst 6%, then the velocity exposure correction signal in line 159 would have a value of from approximately $-\Delta VEC$ to $\Delta VEC$ where $\Delta VEC$ is the velocity exposure correction voltage and is 0.03 volts when at a maximum. It should be understood that the pulse signal output from oscillator 506 is of a frequency adapted to drive counter 510 such that it outputs address signals to table 514 in close relation with the actual angle of scan in the image plane. As such, table 514 will output exposure correction values synchronized with the reflected scan angle of the beam in the image plane. In the preferred embodiment, it is desirable to use the full range of resolution of the D/A converter 518. Accordingly, the circuit 522 may be implemented using an appropriately valued scaling resistor.

A second counter 528 is adapted to provide address signals representing the individual facets of the polygon. Each time counter 528 receives an end-of-scan signal from line 132, the output from counter 528 is incremented to an address representing the next facet on the polygon. A signal from the encoder 162 through line 164 (as shown in FIG. 1) is fed into counter circuit 528 to reset it. In this way, counter 528 keeps track of the particular facet being used to scan a line in the image plane. The output from counter 528 is fed into look-up table 532. Look-up table 532 is adapted to output various types of error correction values pertinent to an individual facet. For example, Output 1 in table 532 lists the reflectivity correction values for each facet. Because these values do not change significantly over the life of the scanner they are measured and placed in the Output 1 listing during set-up of the scanner. These reflectivity correction values from Output 1 are output from table 532 via line 538 to D/A converter 540 which generates an analog voltage signal proportional to the exposure error in the image plane caused by facet reflectivity variations. The output from D/A 540 is proportioned, or scaled, with respect to the same reference value R, by means of circuit 544, to proportion the signal output of line 158 in order to create a facet reflectivity variation signal. For example, if the exposure error due to facet-reflectivity-variation for the particular polygon in use is 4%, the voltage signal in line 158 would vary from $-\Delta FR$ to $\Delta FR$ where $\Delta FR$ represents the facet reflectivity variation signal and has a maximum of 0.02 volts assuming the nominal reference voltage in line 156 leading to D/A converter 142 in FIG. 1 is one volt. Again, in the preferred embodiment, it is desirable to use the full range of resolution of the D/A converter 540. Accordingly, the circuit 544 may be implemented using an appropriately valued scaling resistor.

The proportioned, or scaled, output from the converter 518 (velocity exposure variation signal) on the line 159 and the proportioned, or scaled, output from the converter 540 (facet reflectivity variation signal) on the line 158 are combined with the intensity correction signal on the line 154 at the summing junction 545. The intensity correction signal on the line 154 is also scaled with respect to the reference R, as will be developed. The combination of these signals forms the total error correction signal which is applied on the line 156 to the reference input of the image data digital to analog converter 142.

Within table 532 of FIG. 5 there is also an Output 2 listing. In this example, Output 2 represents the corrective values necessary to compensate for facet radial protrusion error. With such an error, the time between start-of-scan and end-of-scan will vary from facet to facet. If for example, a facet has a slightly greater distance from the image plane than the average facet, then its reflected spot velocity in the image plane is likely to be slightly faster. If the image data is written out into the image plane at the rate of the average facet spot velocity, the image written with the facet that has a higher spot velocity will appear expanded and have slightly lower exposure. This type of error is integrative. That is, the error becomes more noticeable at the end of the scan rather than the beginning of the scan. In order to compensate for the radial protrusion error, the radial protrusion error values in Output 2 of table 532 are established such that they modify the overall pixel rate of the image data. For example, if a particular facet has a spot velocity that is 1% faster than the average spot velocity in the image plane, an Output 2 radial protrusion error value for that particular facet would correspond to a value that would increase the overall pixel rate by 1%. In the example shown in FIG. 5, Output 2 values from table 532 lead to a D/A converter 547 via line 546. The D/A converter then outputs a radial protrusion correction signal, which is proportional to the radial protrusion error value, and which modifies the output frequency of voltage controlled oscillator 564 after passing through a summing circuit 550.

As previously described, counter 510 successively generates address signals which are fed into look-up table 556 (as well as table 514) via line 512. Look-up table 556 provides correction values for discrete portions of the image written to the image plane. When an image is scanned with, for example, a polygon mirror and a special scan lens is not utilized, a radial position error, as well as the velocity exposure error previously described, occurs. If the image data is written out at a constant pixel rate, the image will be expanded in positions away from the center of scan. This is due to the increase in scan radius (distance from the facet to the scan point in the image plane) when scanning along regions other than the center of scan. If the pixel rate is increased at both ends of the scan, then the scan radius expanded portions of the image will effectively become compressed. This compression can be adapted to compensate for the scan radial position error. Table 556 has a listing of outputs which correspond to a radial position error correction value for the pixel rate as a function of scanning angle. In the preferred embodiment, the radial position error correction values are divided into 900 values, each representing a fractional degree portion of the scan. For example, in the presently preferred embodiment, which has an overall scan angle varying from $-13.5°$ to $13.5°$, an output radial position error correction value exists for every $0.03°$. These values are calculated using a function of $1/\cos^2(\emptyset)$. For example, Output $\emptyset 1$ would represent the scan radial-position-error-correction-value at the beginning of the scan where the angle equals $-13.5°$. The effect of Output $\emptyset 1$ therefore would be to increase the pixel rate signal by approximately 5.44%. At the center of scan or at a scan angle of $0°$, the output radial position error correction value from table 556 would be $\emptyset 450$ and the pixel rate would not be corrected due to radial position errors.

The radial position error correction values from table 556 are converted into analog signals in D/A converter 560. These signals are then summed in circuit 550 with the signals generated as a result of radial protrusion error compensation to create a radial correction signal. The radial correction signal is then applied to a voltage controlled oscillator 564 which generates the pixel rate adapted to drive the image data source 138 via line 136 in FIG. 1.

It should be understood that the various formulas and values used to create the output lists in the look-up tables are often a matter of design choice and may vary from one scan system geometry to another. For example, it is possible and even probable that the center of the image plane is not necessarily the same position as the $0°$ angle of reflection from the polygon facet. That is, the image plane may be offset. In such a case the $1/\cos^2(\emptyset)$ correction would be modified in the tables to correct for the offset. In some cases, a particular designer of the scan system may choose a substantially equivalent trigonometric, power series, or polynomial function to generate the correction values in the look-up tables. In fact, it may even be preferred to write the image on, for example, a film and determine the correction values by means of image position and image density measurements made from the film. In addition, it is to be appreciated by those skilled in the art that fewer correction values may be utilized in the tables or more correction values may be utilized depending on the degree of correction and precision of correction needed for the system use. Furthermore, it is anticipated that alternative electronic means to generate the error correction signals, which do not rely on look-up tables and the like, can be devised by one skilled in the art.

As noted, within the modulation signal generator 152 of FIG. 1, the error signals from lines 154, 158, and 159 are added together to create a summed reference voltage leading into D/A 142 via line 156. Each of the error signals has proportioned voltage values adapted to compensate for the error it characterizes. When these values are summed, a combined modulation error signal is created that causes D/A 142 to modulate the image data signals by multiplication, thereby generating a modulated image signal.

Figure 6:
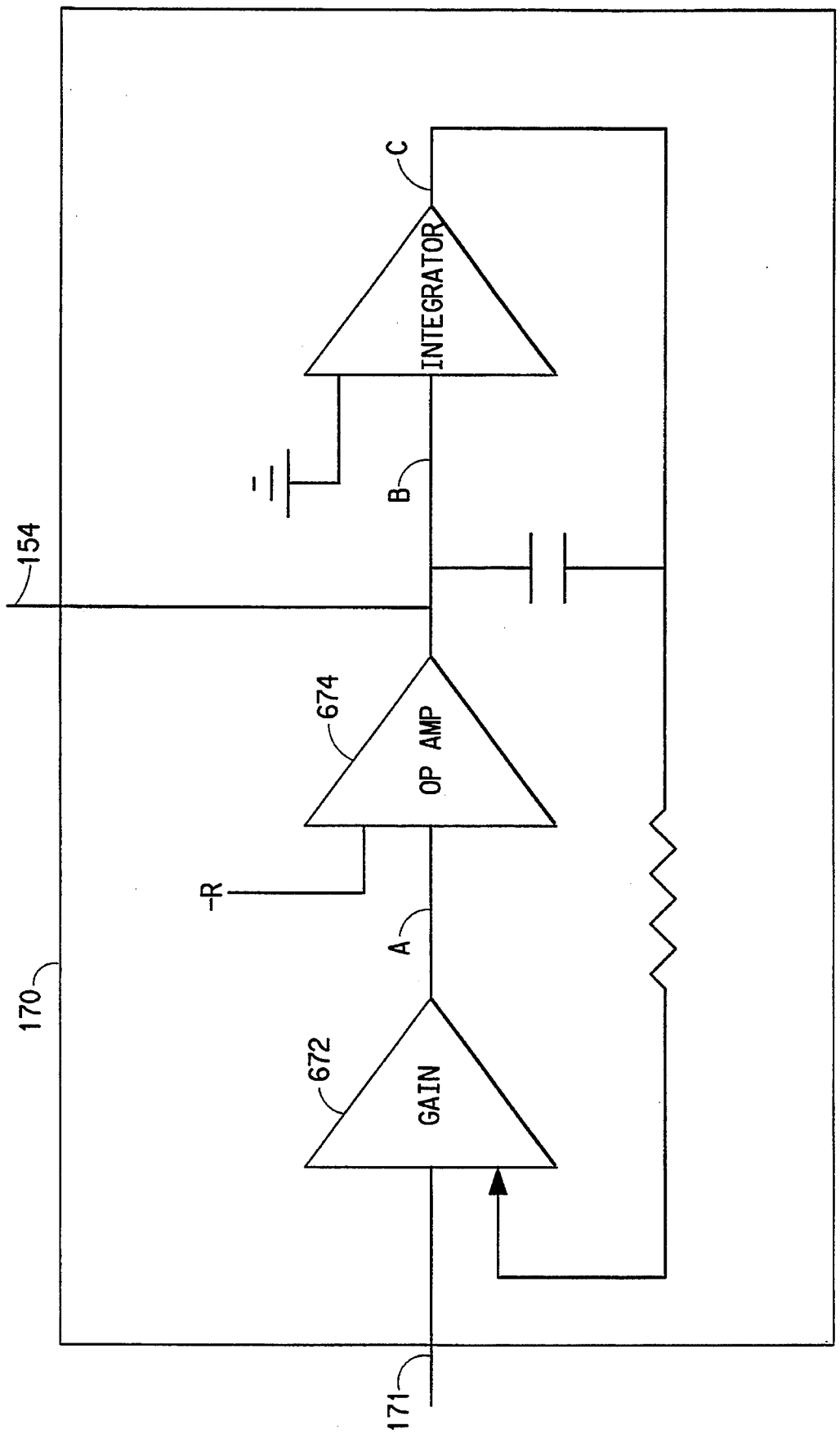
FIG. 6 is a schematic depiction of the preferred normalized error signal generating circuit used in the instant invention.

Circuit 170 of FIG. 1 essentially averages the sensed beam intensity, normalizes the average value relative to a common reference value and outputs the error or deviation in the sensed intensity to the other system electronics as described above. FIG. 6 shows circuit 170 of FIG. 1 in more detail.

A signal from a light intensity sensor 108 in line 171 enters gain controlled amplifier 672. This signal may be shown mathematically as L(λ+1) where L is a signal proportional to the nominal beam intensity and λ is the error or variation in beam intensity from, for example, a high frequency intensity variation originating from the laser power source. On the output of gain controlled amplifier 672 a signal A may be measured which is proportional to the equation G[L(λ+1)], where G represents the feed-back gain signal C entering the amplifier 672. Signal A is input to op amp 674 where it is summed with the same amplitude of reference voltage R that is used to scale the velocity exposure correction and the facet reflectivity variations signals. The output of op amp 674 at point B is a signal that is proportional to G[L(λ+ 1)]−R. This signal then enters integrator 676 which essentially averages the signal over time wherein λ-->0. The voltage C on the output of integrator 676 controls the gain of amplifier 672 such that:

Integral{G[L(λ+1)]−R}d ==>G * L−R=0

Since G now becomes R/L, the output of op amp 674 becomes:

(R/L) * [L(λ+1)]−R=R * λ

Therefore the signal in line 154 of FIG. 1 and FIG. 6 represents the normalized variation of the laser intensity output proportioned to the reference voltage −R. This signal is called the laser intensity variation signal.

Another signal may be mathematically represented R * ΔFR where ΔFR is the facet-reflectivity-variation relative to an average facet reflectivity for the polygon. As described above, the facet reflectivity variation values are preferably listed in a table as an Output 1 listing in table 532 of FIG. 5. These values are accessed as a particular facet is being used to scan the image plane. Therefore, a signal in line 158 is R * ΔFR during any particular scan.

The signal in line 159 of FIG. 1 and FIG. 5 is the velocity-exposure-correction-signal. This signal is adapted to be proportional to R * ΔVEC, where ΔVEC is the velocity exposure correction value proportioned to the error in the scanning system due to velocity exposure error in the image plane.

The individual signals in lines 154, 158, and 159 are added together in modulation signal generator 152 to create a reference voltage in line 156 which is proportional to R (1−λ−ΔFR+ΔVEC). This signal, which is an error correction signal, is then input into D/A 142 where it multiplies the image data from source 138 to compensate for the individual errors of the scan system as a whole.

Those skilled in the art, having the benefit of the teachings of the present invention as hereinabove set forth, may effect numerous modifications thereto. All such modifications are to be construed to lie within the contemplation of the present invention, as defined by the appended claims.

What is claimed is:

1. A method for correcting errors in a scanning system having a laser beam, an acousto-optic modulator adapted to modulate the beam, a rotating polygon having facets adapted to reflect the modulated beam across an image plane, and an image data signal driven at a pixel rate, wherein the improvement comprises the steps of:

a) sensing the intensity of a laser beam, said beam having intensity variations;

b) determining the reflectivity of each of the facets to obtain a facet reflectivity variation;

c) proportioning said sensed intensity variation relative to a common reference in order to create an intensity variation signal proportional to said intensity variation;

d) proportioning said sensed facet reflectivity variation relative to said common reference in order to create a facet reflectivity variation signal proportional to said facet reflectivity variation;

e) combining said intensity variation signal and said facet reflectivity variation signal in order to provide an error correction signal, said error correction signal being adapted to correct for said beam intensity variation and said facet reflectivity variation;

f) combining said error correction signal with the image data signal in order to provide a modulated image signal; and, g) in coordination with the rotation of said polygon controlling said acousto-optic modulator in accordance with said modulated image signal in order to provide a corrected imagewise exposure in the image plane.

2. The method for correcting errors in a scanning system of claim 1 further comprising the steps of:

h) determining a velocity exposure error;

i) proportioning said velocity exposure error relative to said common reference in order to create a velocity exposure correction signal proportional to said velocity exposure error; and, j) combining said velocity exposure correction signal with said error correction signal.

3. The method for correcting errors in a scanning system of claim 1 further comprising the steps of:

h) determining a radial position error correction value;

i) generating a radial correction signal proportional to said radial position error correction value;

j) modifying the pixel rate of said image data signal in accordance with said radial correction signal.

4. The method for correcting errors in a scanning system of claim 1 further comprising the steps of:

h) determining a radial protrusion error value;

i) generating a radial correction signal proportional to said radial protrusion error value; and, j) modifying the pixel rate of said image data signal in accordance with said radial correction signal.

5. The method for correcting errors in a scanning system of claim 1 further comprising the steps of:

h) determining a radial position error correction value;

i) determining a radial protrusion error value;

j) combining said radial position error correction value and said radial protrusion error value in order to develop a radial correction signal proportional to the summation of said radial position error correction value and said radial protrusion error value; and, k) modifying the pixel rate of said image data signal in accordance with said radial correction signal.

6. The method for correcting errors in a scanning system of claim 2 further comprising the steps of:

k) determining a radial position error correction value;

l) generating a radial correction signal proportional to said radial position error correction value;

m) modifying the pixel rate of said image data signal in accordance with said radial correction signal.

7. The method for correcting errors in a scanning system of claim 2 further comprising the steps of:

k) determining a radial protrusion error value;

l) generating a radial correction signal proportional to said radial protrusion error value; and, m) modifying the pixel rate of said image data signal in accordance with said radial correction signal.

8. The method for correcting errors in a scanning system of claim 1 further comprising the steps of:

k) determining a radial position error correction value;

l) determining a radial protrusion error value;

m) combining said radial position error correction value and said radial protrusion error value in order to develop a radial correction signal proportional to the summation of said radial position error correction value and said radial protrusion error value; and, n) modifying the pixel rate of said image data signal in accordance with said radial correction signal.

9. A method for correcting errors in a scanning system having a laser beam, an acousto-optic modulator adapted to modulate the beam, a rotating mirror adapted to reflect the modulated beam across an image plane, and an image data signal, driven by a pixel rate, wherein the improvement comprises the steps of:

a) sensing the intensity of a laser beam, having intensity variations;

b) determining a velocity exposure error;

c) proportioning said sensed intensity variation relative to a common reference in order to create an intensity variation signal proportional to said beam intensity variation;

d) proportioning said velocity exposure error relative to said common reference in order to create a velocity exposure correction signal proportional to said velocity exposure error; and, e) combining said intensity variation signal and said velocity exposure correction signal in order to provide an error correction signal, said error correction signal being adapted to correct for said beam intensity variation and said velocity exposure error;

f) combining said error correction signal with the image data signal in order to provide a modulated image signal; and, g) in coordination with the rotation of said polygon controlling said acousto-optic modulator in accordance with said modulated image signal in order to provide a corrected imagewise exposure in the image plane.

10. The method for correcting errors in a scanning system of claim 9 further comprising the steps of:

h) determining a radial position error correction value;

i) generating a radial correction signal proportional to said radial position error correction value;

j) modifying the pixel rate of said image data signal by means of said radial correction signal.

11. The method for correcting errors in a scanning system of claim 9 further comprising the steps of:

h) determining a radial protrusion error value;

i) generating a radial correction signal proportional to said radial protrusion error value; and, j) modifying the pixel rate of said image data signal in accordance with said radial correction signal.

12. The method for correcting errors in a scanning system of claim 9 further comprising the steps of:

h) determining a radial position error correction value;

i) determining a radial protrusion error value;

j) combining said radial position error correction value and said radial protrusion error value in order to develop a radial correction signal proportional to the summation of said radial position error correction value and said radial protrusion error value; and, k) modifying the pixel rate of said image data signal in accordance with said radial correction signal.

13. A method for correcting errors in a scanning system having rotating polygon having facets adapted to reflect a modulated beam across an image plane, and an image data signal driven at a pixel rate, wherein the improvement comprises the steps of:

a) determining a radial protrusion error value;

b) generating a radial correction signal proportional to said radial protrusion error value; and, c) modifying the pixel rate of said image data signal in accordance with said radial correction signal.

14. A method for correcting errors in a scanning system having rotating polygon having facets adapted to reflect a modulated beam across an image plane, and an image data signal driven at a pixel rate, wherein the improvement comprises the steps of:

a) determining a radial position error correction value;

b) determining a radial protrusion error value;

c) combining said radial position error correction value and said radial protrusion error value in order to develop a radial correction signal proportional to the summation of said radial position error correction value and said radial protrusion error value; and, d) modifying the pixel rate of said image data signal in accordance with said radial correction signal.

15. In a laser scanning system having a laser beam source, a modulator adapted to modulate the beam, a rotating mirror having a plurality of facets adapted to reflect a modulated laser beam across an image plane at a velocity, the improvement comprising:

means for generating electrical signals representative of variations in the intensity of the laser beam, variation in facet to facet reflectivities of the mirror, and variation in beam velocity, means for proportioning at least two of the electrical variation signals with respect to a common reference, and means for combining scaled errors to produce a total system error signal.

16. The apparatus of claim 15, wherein the modulated laser beam is driven at a pixel rate, further comprising:

means for generating an electrical correction signal representaing a mirror radial position error correction value;

means for modifying the pixel rate in accordance with the radial correction signal.

17. The apparatus of claim 15, wherein the modulated laser beam is driven at a pixel rate, further comprising:

means for generating an electrical correction signal representaing a mirror radial protrusion error correction value;

means for modifying the pixel rate in accordance with the radial protrusion error correction signal.

18. The apparatus of claim 15, wherein the modulated laser beam is driven at a pixel rate, further comprising:

means for generating an electrical correction signal representaing a mirror radial position error correction value;

means for generating an electrical correction signal representing a mirror radial protrusion error correction value;

means for combining mirror radial position error correction value and the mirror radial protrusion error correction to develop a mirror radial correction signal proportional to the summation of said radial position error correction value and said radial protrusion error value; and, means for modifying the pixel rate in accordance with the mirror radial correction signal.

* * * * *